(12) United States Patent
Martin

(10) Patent No.: US 9,703,072 B2
(45) Date of Patent: Jul. 11, 2017

(54) WIDE-ANGLE LENS

(71) Applicant: LEICA CAMERA AG, Wetzlar (DE)

(72) Inventor: Alexander Martin, Gießen (DE)

(73) Assignee: LEICA CAMERA AG, Wetzlar (DE)

( * ) Notice: Subject to any disclaimer, the term of this patent is extended or adjusted under 35 U.S.C. 154(b) by 0 days.

(21) Appl. No.: 14/843,567

(22) Filed: Sep. 2, 2015

(65) Prior Publication Data

US 2016/0070086 A1     Mar. 10, 2016

(30) Foreign Application Priority Data

Sep. 5, 2014   (DE) .......................... 10 2014 112 853

(51) Int. Cl.
| | | |
|---|---|---|
| G02B 13/18 | (2006.01) | |
| G02B 3/02 | (2006.01) | |
| G02B 9/00 | (2006.01) | |
| G02B 9/08 | (2006.01) | |
| G02B 9/64 | (2006.01) | |
| G02B 27/00 | (2006.01) | |
| G02B 7/10 | (2006.01) | |

(52) U.S. Cl.
CPC ................. G02B 9/64 (2013.01); G02B 7/10 (2013.01); G02B 13/18 (2013.01); G02B 27/0025 (2013.01)

(58) Field of Classification Search
CPC ...... G02B 9/64; G02B 13/18; G02B 27/0025; G02B 7/10
USPC .......................... 359/649, 680, 684, 738–740
See application file for complete search history.

(56) References Cited

U.S. PATENT DOCUMENTS 4,783,157 A * 11/1988 Harrigan .................. G02B 9/64
359/750
5,315,441 A    5/1994 Hori et al.

* cited by examiner

*Primary Examiner* — Alicia M Harrington
(74) *Attorney, Agent, or Firm* — Foley & Lardner LLP

(57) ABSTRACT

Wide-angle lens comprising floating element (G2) and aperture stop (BL) comprising a group (G1) of ten lens elements with refractive power sequence arranged in a manner mirrored in sign with respect to the stop (BL), wherein lens elements having positive and negative refractive power are arranged alternately in the light direction upstream and downstream of the stop (BL) and the group (G1) is displaceable for the purpose of focusing.

19 Claims, 1 Drawing Sheet

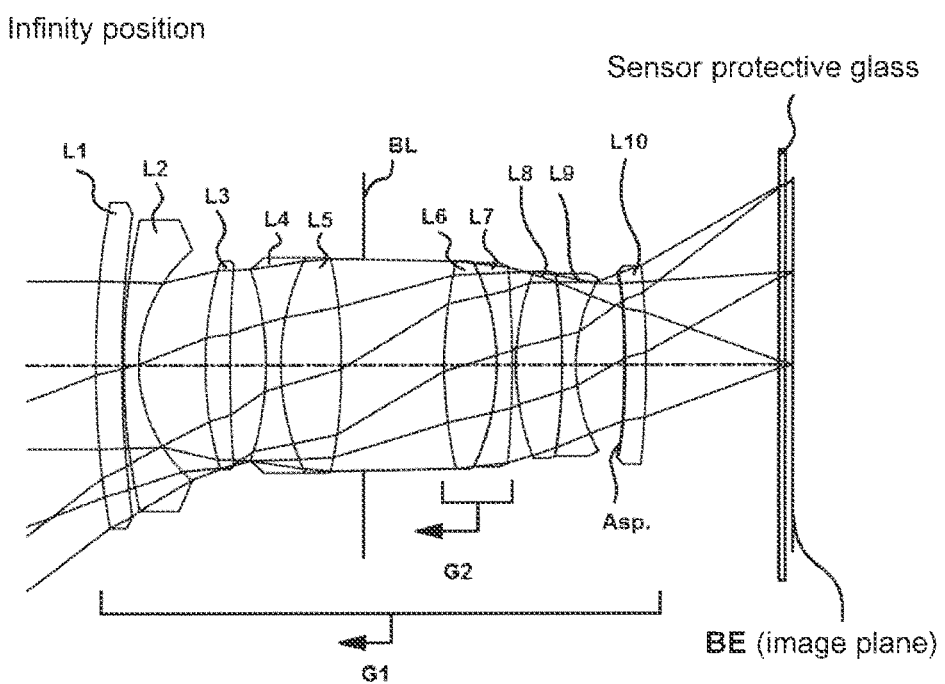

WIDE-ANGLE LENS

CROSS-REFERENCE TO RELATED PATENT APPLICATIONS

Germany Priority Application 10 2014 112 853.2, filed Sep. 5, 2014 including the specification, drawings, claims and abstract, is incorporated herein by reference in its entirety.

BACKGROUND

The invention relates to a photographic wide-angle lens comprising overall focusing, floating element and aperture stop. Overall focusing denotes the movement of the overall lens relative to the image plane during focusing. A floating element is part of the overall lens and is additionally displaced during the focusing within the overall lens. The aperture stop determines the aperture ratio of the lens. Lenses comprising these elements are known per se.

The document U.S. Pat. No. 5,315,441 A discloses a wide-angle lens having a focusing possibility for the lens elements L2 to L8 combined in three groups G2-G4, wherein the group G3 constitutes a floating element, and comprising a stop S downstream of the group G2.

SUMMARY OF THE INVENTION

The present invention was based on an object of providing a wide-angle lens having very good imaging performance over the entire image field in conjunction with a very compact structural length and very low distortion. In this case, the intention was to achieve a very good chromatic correction in conjunction with a high f-number, a very good producability with balanced tolerances and high contrast values over the entire image field.

This object is achieved according to the invention by means of a design of the wide-angle lens comprising features set forth below.

Advantageous embodiments are set forth herein.

One exemplary embodiment of the wide-angle lens according to the invention in the focal position for infinite object distance is illustrated schematically in the FIGURE and is described in greater detail below with reference to the FIGURE.

Further objects, features and advantages of the present invention will become apparent from the detailed description of preferred embodiments that follows, when considered together with the accompanying FIGURE of drawing.

BRIEF DESCRIPTION OF THE DRAWING

The FIGURE shows a photographic wide-angle lens comprising overall focusing and floating element. A photoelectric sensor with protective glass is arranged in the image plane BE. During focusing from infinity position to near position, the entire optical system, Group 1 (G1), is moved away from the image plane BE. Group 2 (floating element, G2) in this case moves in the same direction, but faster than the rest of the optical system. That is represented by arrows of different lengths. The arrow direction reverses in the case of movement back into the infinity position.

DETAILED DESCRIPTION

The imaging length (focal range of the lens) is between infinity and 0.7 m. The entire group G1 covers 1.05 mm during focusing. Group G2 covers 0.27 mm in addition thereto, such that the total movement of group G2 during focusing from infinity to 0.7 m covers a total travel of 1.32 mm.

The movement of group G2 ensures a correction (neutralization) of the imaging aberrations that arise as a result of the movement of group G1.

The design of this wide-angle lens is characterized in that positive and negative refractive powers occur in strict alternation. The behavior of the refractive powers is mirrored about the stop (BL). This particular design allows the optical aberrations to remain at a minimum. The particular challenge is to allow the absolute values of the refractive power to alternate in such a way that a balance occurs for the 7 optical aberrations that very often manifest opposite behavior. This is brought about with the distribution of the refractive powers of the lens elements according to the following listing.

Lens element 1 (positive), Refractive power=0.65 dpt.
Lens element 2 (negative), Refractive power=−18.93 dpt.
Lens element 3 (positive), Refractive power=−15.54 dpt.
Lens element 4 (negative), Refractive power=−42.54 dpt.
Lens element 5 (positive), Refractive power=43.22 dpt.
Stop (BL)
Lens element 6 (positive), Refractive power=43.09 dpt.
Lens element 7 (negative), Refractive power=−22.42 dpt.
Lens element 8 (positive), Refractive power=41.19 dpt.
Lens element 9 (negative), Refractive power=−42.77 dpt.
Lens element 10 (positive), Refractive power=1.51 dpt.

The mirrored design of the refractive powers about the stop brings about a low distortion of the wide-angle lens.

One special feature compared with other wide-angle lenses in this category (category features: wide angle, miniature format lenses, f-number) is the small magnitude of the distortion. The latter is only −0.6% in the near position (0.7 m). This extraordinarily low value of the distortion in the near position is attributable to the design of the lens, i.e. distribution of the refractive powers about the stop.

One special feature in the design is the aspherical lens element (L10). The a sphere is situated on the lens element 10. This is a particularly weak lens element in terms of the refractive power. The distant position of the lens element 10 from the stop and the weak refractive power thereof have the effect that the influence on the spherical aberration of the lens is very small. At the same time, the influence on optical coma is very strong as a result of the aspherical surface (Asp.). Lens element 10 brings about a decoupling of the optical aberrations as a result of its particular position, refractive power and aspherical surface. As a result of this decoupling, optical aberrations can be individually corrected much more effectively than if they mutually influenced one another. The result of the decoupling is a high performance of the lens. The second effect of the decoupling is the better adjustability of the lens. Only one optical aberration (coma) is actually given consideration in the adjustment of the aspherical lens element 10. This facilitates the adjustment and increases productivity.

The special feature of the short structural length of the wide-angle lens is based on the three cemented elements. Each cemented element shortens the structural length because two cemented lens elements take up less space than two uncemented lens elements. The difficulty here consists in obtaining the optical performance (contrast) because one degree of freedom (lens element radius) is omitted with each cemented element.

The first cemented element, lens element 4/lens element 5, consisting of a negative lens element 4 (refractive power=−42.54 dpt.) and a positive lens element 5 (refractive power=43.22 dpt.), is embodied such that the refractive powers of the two lens elements mutually almost cancel one another out. The resulting refractive power is very weak. With a low Abbe number for lens element 4 ve=31.92 in conjunction with a medium refractive index ne=1.677644 and a higher Abbe number ve=40.52 for lens element 5 in conjunction with a high refractive index ne=1.888146, it is possible to achieve a cemented element combination which has a very expedient effect on the chromatic aberrations and the image field curvature of the lens.

The second cemented element, lens element 6/lens element 7, is the floating element. It consists of two cemented lens elements. The lens element 6 (positive refractive power) has refractive index ne=1.820167, Abbe number ve=46.37 and refractive power=43.09 dpt. Lens element 7 (negative refractive power) has refractive index ne=1.791873, Abbe number ve=25.69 and refractive power=−22.42 dpt. The combination of the refractive indexes, Abbe numbers and refractive powers ensures that the floating element has very low image field curvature and chromatic aberrations. This in turn has the effect that the lens has a very high contrast over the entire focusing range during the movement of the floating element.

The third cemented element consists of a lens element 8 having positive refractive power=41.19 dpt. and the lens element 9 having negative refractive power=−42.77 dpt. In the case of this cemented element, too, analogously to the first cemented element, the refractive powers almost cancel one another out. Here, too, with a low Abbe number for lens element 9 ve=31.92 in conjunction with a medium refractive index ne=1.677644 and a higher Abbe number ve=40.52 for lens element 8 in conjunction with a high refractive index ne=1.888146, it is possible to achieve a cemented element combination which has a very expedient effect on the chromatic aberrations and the image field curvature of the lens.

Identical glass combinations are used in the case of cemented element 1 and cemented element 3. The order is mirror-inverted. Each of the cemented elements was embodied in such a way that the lens element having positive refractive power acquires a higher refractive index ne and also the higher Abbe number ve than the lens element having negative refractive power. The refractive power ratios, Abbe number ratios and refractive index ratios are crucial for the good chromatic correction and low Petzval sum, which in turn results in a low image field curvature.

The lens elements 2, 3, 5, 6, 7, 8, 10 of the photographic lens all have an anomalous partial dispersion.

Lens elements having an anomalous partial dispersion have the task of correcting the wavelengths of the secondary spectrum (violet-blue wavelength range). The anomalous partial dispersion is an optical property of the glass used. The glass has the property of refracting the violet-blue wavelengths greatly differently from the red wavelengths. Since optics as a science differentiates strictly according to direction, there is a positive and a negative anomalous partial dispersion. The SCD values, either positive or negative, indicate the absolute value and thus the effect of the anomalous partial dispersion.

In order to be able to utilize the anomalous partial dispersion of the glass for chromatic correction, this requires the particular combination of refractive power, position of the lens in relation to the stop, and the sign of the anomalous partial dispersion, for the respective lens element.

The lens element 2 has a very strong positive anomalous partial dispersion SCD. Lens element 2 has refractive index ne=1.439854, Abbe number ve=94.49, SCD=0.3260 and refractive power=−18.93 dpt. Its position, far away from the stop in the front lens element region, negative refractive power, a very high Abbe number and strong positive anomalous partial dispersion bring about high chromatic correction and correction of the secondary spectrum (violet-blue wavelength range). This in turn has the effect that the contrast (MTF curves) of the lens is very high.

The lens elements 3, 5, 6, 7, 8, 10 have the following optical values:

|  | Refractive index ne | Abbe number ve | SCD value | Refractive power |
| --- | --- | --- | --- | --- |
| Lens element 3 | 1.888146 | 40.52 | −0.1082 | 15.54 dpt. |
| Lens element 5 | 1.888146 | 40.52 | −0.1082 | 43.22 dpt. |
| Lens element 6 | 1.820167 | 46.37 | −0.0895 | 43.09 dpt. |
| Lens element 7 | 1.791873 | 25.69 | 0.1036 | −22.42 dpt. |
| Lens element 8 | 1.888146 | 40.52 | −0.1082 | 41.19 dpt. |
| Lens element 10 | 1.834261 | 36.87 | −0.1053 | 1.51 dpt. |

All the lens elements presented contribute to their violet-blue wavelength range being corrected as well as possible.

It is not always advantageous to have a high anomalous partial dispersion. Sometimes a high anomalous partial dispersion in combination with high refractive power manifests a destructive effect on the violet-blue wavelength range. This is the case whenever the position of the lens element in the overall design requires glass properties that do not exist in reality. In such cases it is advantageous to minimize lens element refractive power and the anomalous partial dispersions. The lens elements presented in the table above have a low negative or positive anomalous partial dispersion.

Unusually for a wide-angle lens, the positive front lens element is lens element 1 having refractive power=0.65 dpt. This lens element brings about an additional correction of distortion both at infinity and up to a focusing distance of 0.7 m.

The balanced tolerances of the lens and good producability were achieved by virtue of the fact that the lens elements 2 to 9 have a balanced refractive power ratio. The strongest lens element in terms of refractive power is approximately 2.8× as strong as the refractive power of the weakest lens element. If this ratio is exceeded, then the tolerances become increasingly less agreeable. The lens elements 1 and 10 have special functions in the design. Therefore, their refractive powers are intentionally dimensioned to be very weak and are unimportant for the refractive power ratio. As described above, lens element 10 is a substrate for the aspherical surface; it serves for decoupling the optical aberrations. Lens element 1 protects lens element 2 against physical and chemical influences; its secondary task is additional correction of the distortion.

The wide-angle lens has an aperture ratio of 1:1.4 and a focal length of 28 mm.

The foregoing description of preferred embodiments of the invention has been presented for purposes of illustration and description only. It is not intended to be exhaustive or to limit the invention to the precise form disclosed, and modifications and variations are possible. It is intended that the scope of the invention be defined with reference to the claims appended.

What is claimed is:
1. A wide-angle lens comprising:
an aperture stop; and a group of ten lens elements with refractive power sequence arranged in a manner mirrored in sign with respect to the stop, wherein five of the ten lens elements are on one side of the stop and another five of the ten lens elements are on an other side of the stop, wherein lens elements having positive and negative refractive power are arranged alternately in a light direction upstream and downstream of the stop and are provided with individually different values of refractive power, the group of ten lens elements including a floating element arranged along an optical axis of the wide-angle lens, the floating element is arranged downstream of the stop in the light direction, and the entire group is displaceable relative to a fixed image plane to focus the wide-angle lens, and for the focusing movement of the group, the floating element is displaceable within the group in an equidirectional manner.

2. A wide-angle lens according to claim 1, wherein the group includes a pair of lens elements having negative and positive refractive power, respectively, which are arranged upstream of the stop and are combined to form a first cemented element.

3. A wide-angle lens according to claim 2, wherein the refractive powers of the lens elements of the first cemented element substantially cancel one another out.

4. A wide-angle lens according to claim 1, wherein four lens elements which follow the stop are combined to form a second and third cemented element.

5. A wide-angle lens according to claim 4, wherein the second cemented element, as the floating element, is arranged such that it is movable away from the image plane during the focusing of the wide-angle lens.

6. A wide-angle lens according to claim 5, wherein the adjustment travel of the floating element within the wide-angle lens is greater than the adjustment travel of the wide-angle lens.

7. A wide-angle lens according to claim 6, wherein the adjustment travel of the floating element is 1.257 times longer than that of the wide-angle lens.

8. A wide-angle lens according to claim 4, wherein the refractive powers of the lens elements of the third cemented element substantially cancel one another out.

9. A wide-angle lens according to claim 1, wherein the group includes a pair of lens elements having negative and positive refractive power, respectively, which are arranged upstream of the stop and are combined to form a first cemented element,
wherein four lens elements which follow the stop are combined to form a second and third cemented element,
wherein the lens elements of first and third cemented elements have identical glass combinations, wherein the order of the lens elements is mirror-inverted and in each case the lens element having positive refractive power is equipped with a higher refractive index ne and a higher Abbe number ye than the lens element having negative refractive power.

10. A wide-angle lens according to claim 1, wherein the front lens element is equipped with a positive refractive power.

11. A wide-angle lens according to claim 1, wherein the lens element following the front lens element is equipped with a positive anomalous partial dispersion SDC=0.3260.

12. A wide-angle lens according to claim 1, wherein the last lens element in the light direction has at least one aspherical surface.

13. A wide-angle lens according to claim 12, wherein the surface of the last lens element facing away from the image plane is aspherical.

14. A wide-angle lens according to claim 1, wherein the wide-angle lens has the following refractive power sequence of the ten lens elements
Lens element 1 (positive), Refractive power=0.65 dpt.
Lens element 2 (negative), Refractive power=−18.93 dpt.
Lens element 3 (positive), Refractive power=15.54 dpt.
Lens element 4 (negative), Refractive power=−42.54 dpt.
Lens element 5 (positive), Refractive power=43.22 dpt.
aperture stop
Lens element 6 (positive), Refractive power=43.09 dpt.
Lens element 7 (negative), Refractive power=−22.42 dpt.
Lens element 8 (positive), Refractive power=41.19 dpt.
Lens element 9 (negative), Refractive power=−42.77 dpt.
Lens element 10 (positive), Refractive power=1.51 dpt.

15. A wide-angle lens according to claim 1, wherein the group includes a pair of lens elements having negative and positive refractive power, respectively, which are arranged upstream of the stop and are combined to form a first cemented element,
wherein four lens elements which follow the stop are combined to form a second and third cemented element,
wherein in first and third cemented elements the glass of a negative lens element has a Abbe number ye=31.92 and a refractive index ne=1.677644 and the glass of a positive lens element has a comparably higher Abbe number ye=40.52 in conjunction with a refractive index ne=1.888146.

16. A wide-angle lens according to claim 1, wherein the group includes a pair of lens elements having negative and positive refractive power, respectively, which are arranged upstream of the stop and are combined to form a first cemented element,
wherein four lens elements which follow the stop are combined to form a second and third cemented element,
wherein in the second cemented element the glass of a positive lens element has a refractive index ne=1.820167 and an Abbe number ye=46.37 and the glass of a negative lens element has a refractive index ne=1.791873 and an Abbe number ye=25.69.

17. A wide-angle lens according to claim 1, wherein the glass of the lens element following the front lens element has a refractive index ne=1.439854, an Abbe number ye=94.49 and an anomalous partial dispersion SCD=0.3260.

18. A wide-angle lens according to claim 1, wherein the lens elements of the group are arranged in an order of L1, L2, L3, L4, L5, L6, L7, L8, L9 and L10 in the light direction,
wherein the glasses of the lens elements L3, L5, L6, L7, L8, L10 have a low negative or positive anomalous partial dispersion SCD having the following values:
L3, L5, L8=−0.1082; L6=−0.0895; L7=0.1036; L10=−0.1053.

19. A wide-angle lens according to claim 1, comprising a focal length of 28 mm and an aperture ratio of 1:1.4.

* * * * *